(12) United States Patent
Southworth

(10) Patent No.: US 7,677,206 B1
(45) Date of Patent: Mar. 16, 2010

(54) ORTHOPEDIC BOOT FOR ANIMALS

(76) Inventor: William W. Southworth, 437 S. Main St., Suite 10, Cottonwood, AZ (US) 86326

( * ) Notice: Subject to any disclaimer, the term of this patent is extended or adjusted under 35 U.S.C. 154(b) by 914 days.

(21) Appl. No.: 11/370,566

(22) Filed: Mar. 8, 2006

(51) Int. Cl.
*A61D 9/00* (2006.01)
*A01K 13/00* (2006.01)

(52) U.S. Cl. ......................................... 119/850; 36/111

(58) Field of Classification Search ................. 119/850, 119/851; D30/144–146; 36/111, 114, 115, 36/3 A; 54/82; 168/1, 2
See application file for complete search history.

(56) References Cited

U.S. PATENT DOCUMENTS

| | | | | |
|---|---|---|---|---|
| 169,653 | A * | 11/1875 | Moses | 168/25 |
| 211,897 | A * | 2/1879 | Pflueger | 168/25 |
| 584,701 | A * | 6/1897 | Haddox | 168/4 |
| 2,095,869 | A * | 10/1937 | Hermson | 36/1 |
| 4,222,183 | A * | 9/1980 | Haddox | 36/114 |
| 4,693,018 | A * | 9/1987 | Maleyko et al. | 36/1.5 |
| 4,910,887 | A * | 3/1990 | Turner et al. | 36/114 |
| 5,148,657 | A | 9/1992 | Stafford et al. | |
| 5,408,812 | A | 4/1995 | Stark | |
| 5,441,015 | A | 8/1995 | Farley | |
| 5,495,828 | A * | 3/1996 | Solomon et al. | 119/850 |
| D375,586 | S | 11/1996 | Caditz | |
| 5,865,778 | A * | 2/1999 | Johnson | 602/27 |
| D424,253 | S | 5/2000 | Bradley et al. | |
| 6,186,097 | B1 | 2/2001 | Brockmann et al. | |
| 6,305,328 | B1 * | 10/2001 | Marquis | 119/850 |
| 6,470,832 | B1 * | 10/2002 | Peacock | 119/850 |
| 6,526,920 | B1 | 3/2003 | Griffin | |
| 7,334,354 | B2 * | 2/2008 | Foxen et al. | 36/89 |
| 2005/0092260 | A1 | 5/2005 | Paxton et al. | |
| 2005/0150197 | A1 * | 7/2005 | Ford | 54/82 |
| 2005/0241188 | A1 * | 11/2005 | Yun et al. | 36/111 |
| 2007/0039565 | A1 * | 2/2007 | Krottinger | 119/850 |
| 2007/0039566 | A1 * | 2/2007 | Krottinger | 119/850 |
| 2007/0044734 | A1 * | 3/2007 | Maloney et al. | 119/850 |
| 2008/0149046 | A1 * | 6/2008 | Tsai | 119/850 |

OTHER PUBLICATIONS

Application of Polymers; Oct. 19, 1999; retrieved from internet: May 22, 2009.*

* cited by examiner

*Primary Examiner*—Rob Swiatek
*Assistant Examiner*—Kristen C Hayes
(74) *Attorney, Agent, or Firm*—John V. Stewart

(57) ABSTRACT

A boot (10) for enclosing a foot of a quadruped up to, but not including, a carpal or tarsal joint (32), made generally of a first flexible material (14) with a slit (16) forming an opening for inserting the foot. A lower portion of the first flexible material forms a toe box (20). An upper portion of the toe box is formed of a second flexible material (12A, 12B) that is more elastic than the first flexible material, such as an elastic fabric. The elastic fabric allows the toes to flex downward at the end of each step, then pulls them upward to prevent them from curling under the foot on the next step. An upper retainer (16) may be provided on an upward extension strap (15). The upper retainer loops around the leg above the carpal or tarsal joint (32) to provide vertical retention of the boot.

6 Claims, 2 Drawing Sheets

ORTHOPEDIC BOOT FOR ANIMALS

CROSS-REFERENCE TO RELATED APPLICATIONS

BACKGROUND OF THE INVENTION

1. Field of the Invention

This invention relates to orthopedic boots for quadrupedal animals designed to protect and support an injured foot while healing.

2. Description of Prior Art

Various prior boots for quadrupeds provide weather protection, warmth, cushioning, and other benefits. Some of them are intended for support during healing of a foot injury. However, none of them provide an elastic insert on top of the toe box that allows the toes to flex downward at the end of a step, then pulls them back up to prevent "knuckling" or turning of the toes under the foot during the next step.

U.S. Pat. No. 6,186,097 (Brockmann et al., Feb. 13, 2001) discloses a sock made of elastic fabric for dogs. It provides protection and warmth, but has low stability, since it is elastic throughout. The elastic pulls in all directions equally.

SUMMARY OF THE INVENTION

Objectives of this invention include providing an orthopedic boot for quadrupedal animals that protects and supports an injured foot, allows controlled down-ward flexion of the foot, but prevents curling under or "knuckling" of the toes under the foot.

These objects are met in a boot for enclosing a foot of a quadruped up to, but not including, a carpal or tarsal joint, made generally of a first flexible material with a slit forming an opening for inserting the foot. A lower portion of the first flexible material forms a toe box. An upper portion of the toe box is formed of a second flexible material that is more elastic than the first flexible material, such as an elastic fabric. The elastic fabric allows the toes to flex controllably downward at the end of each step and then pulls them upward to prevent them from curling under the foot on the next step. An upper retainer of the boot may be provided on an upward extension strap. The upper retainer loops around the leg above the carpal or tarsal joint to provide vertical retention of the boot, anchoring the toe return tension.

DETAILED DESCRIPTION

The invention is designed to provide stability to a foot damaged either muscularly or neurally, and that is therefore difficult for a dog to control in natural ambulation. In addition, it gives an upward assist to the front of the foot, and allows proper, or near proper, placement of the palmar surface on a walking surface. Its main force advantage is provided by an elastic insert above the toe box. The elastic serves to elevate the front of the foot after a step has been taken with the affected limb. The boot prevents curling under or "knuckling" of the foot and dragging of the toe nails of the affected limb on the ground.

Figure 1:
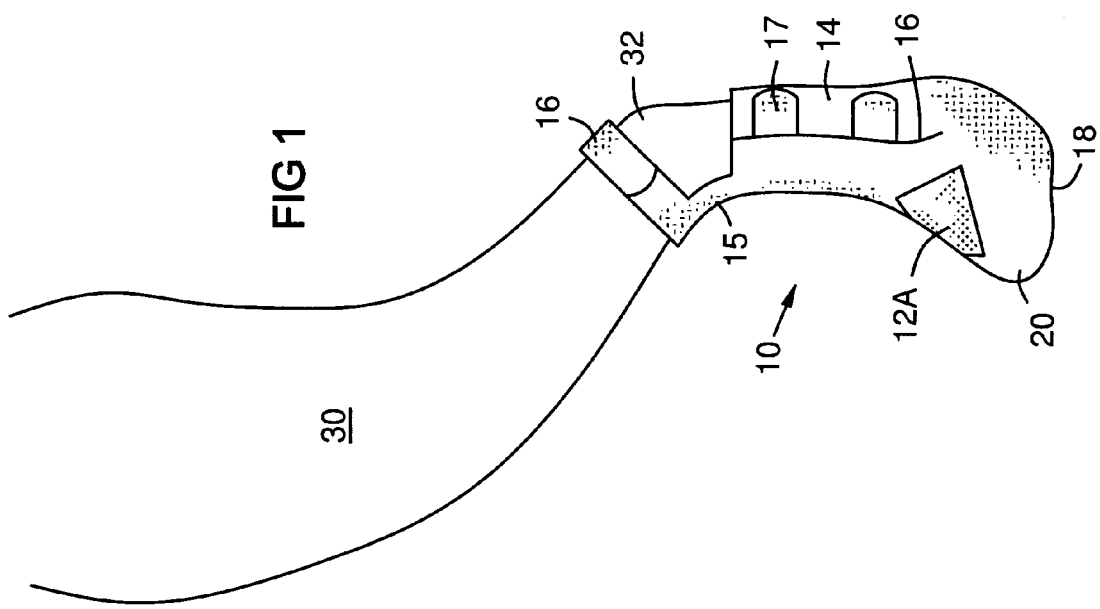
FIG. 1 illustrates a hind leg of a quadruped such as a dog in a standing position equipped with a boot according to the invention.

FIG. 1 shows a hind leg 30 of a dog with a boot 10 according to the invention. The boot may be constructed mainly of a layer 14 of fabric, leather, or other material as known for use in shoe uppers that is flexible, but not highly elastic. This material provides a balance of comfort and support to the injured foot. Low elasticity helps retain the shape and position of the boot on the foot. Layer 14 has an opening 16 that provides clearance for insertion of the foot into the boot. The opening 16 may be provided with a hook-and-loop fastening material such as Velcro® on opposed surfaces, or another known fastening mechanism. Other alternate closures such as laces may be used. Velcro® straps 17 may be provided as shown.

Figure 4:
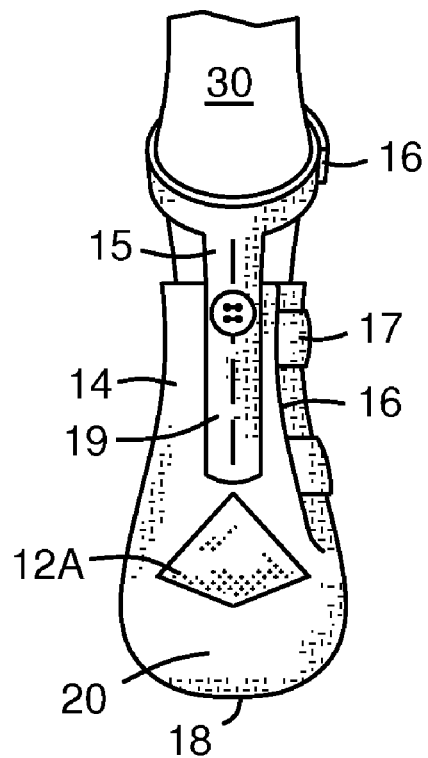
FIG. 4 illustrates a front view as in FIG. 3 with a vertically adjustable upper retainer strap.
Figure 5:
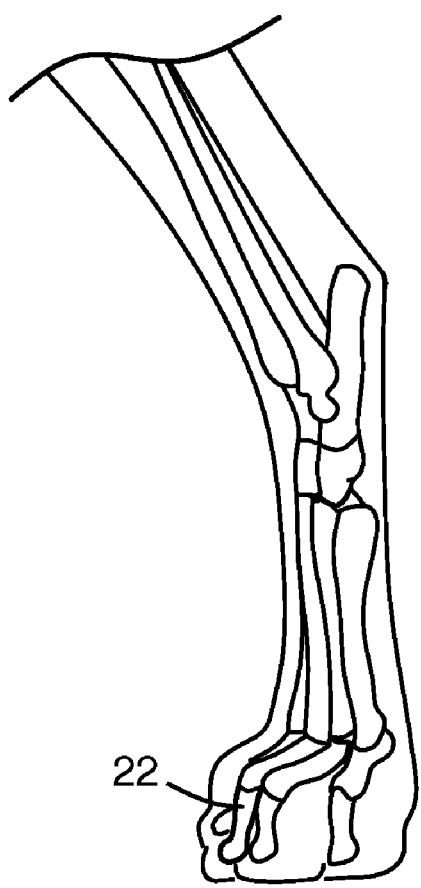
FIG. 5 illustrates dog foot and leg bones.

An upper retainer 16 may be provided to loop around the leg above the carpal or tarsal joint 32. It may be attached to the rest of the boot 14 with an extension strap 15 that allows unrestricted rotation of the joint 32. The extension strap 15 may have a length adjustment as shown in FIG. 4 to accommodate different sized legs. Adjustment may be provided, for example, by an overlapping portion 19 of the extension strap that can be selectively positioned and attached to the boot front with hook-and-loop fastener and/or buckles, a button (shown), or other known devices.

Figure 3:
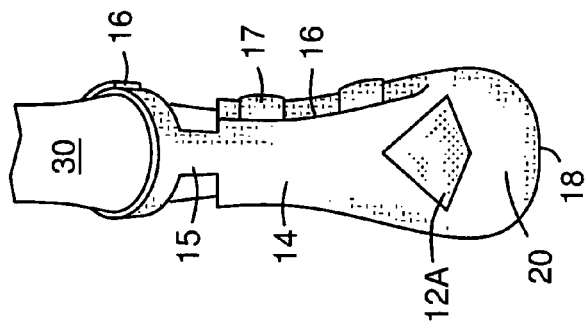
FIG. 3 illustrates a front view of FIG. 1.
Figure 2:
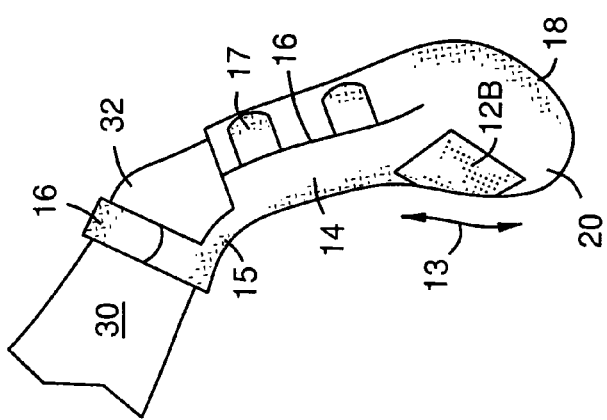
FIG. 2 illustrates a hind leg as in FIG. 1 at the end of a step.

An elastic insert 12A, 12B is provided on the top of the toe box 20 of the boot. This allows the foot to flex downward to some extent, but does not allow the toes or phalanges 22 to curl under the foot. In a standing posture of the animal, the elastic insert 12A is in a retracted or unstretched position as in FIG. 1. At the end of each stride, the elastic insert 12B is stretched 13 as shown in FIG. 2. This causes it to pull the toe box 20 upward to avoid "knuckling", or turning under of the toes on the next step. The elastic insert may be made of a stretchable fabric with interwoven strands of rubber or other highly elastic fiber or it may be made of a stretch fabric such as nylon or a sheet of a rubbery material. A preferred shape of the insert is a generally quadrilateral diamond-shape as shown, which provides a balance of flexibility and restraint. Other shapes, such as circular, elliptical, and the like may be used (not shown).

The sole 18 of the boot may optionally have an exterior layer (not shown) of a durable semi-flexible material such as silicone rubber with a traction surface, as known in shoemaking. Such a layer is optional, and instead the boots may be made like moccasins if the main layer material 14 is durable.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claim:

1. An orthopedic boot for animals, comprising:
   a layer of a first flexible material formed to cover a foot of an animal up to, but not including, a carpal or tarsal joint,
      a lower portion of the first flexible material forming a toe box for enclosing the toes of the foot;
   a generally vertical slit in the flexible material forming an opening in the flexible material for insertion of the foot into the boot;
   a closure mechanism comprising first and second parts on respective opposed surfaces of the flexible slit for closing the opening; and an upper portion of the toe box comprising a section of a second flexible material that is more elastic than at least the lower portion of the first flexible material;

an upward extension strap extending upward from a top front portion of the boot;

an upper retainer attached to a top end of the extension strap, the retainer comprising a strap that closes into a loop around a respective leg of the animal above the carpal or tarsal joint thereof.

2. The orthopedic boot for animals of claim 1, wherein the section of second flexible material is generally quadrilateral in outline.

3. The orthopedic boot for animals of claim 2, wherein the section of second flexible material is generally diamond-shaped, with four corners pointing front, back, left, and right, and the second flexible material is an elastic fabric.

4. The orthopedic boot for animals of claim 1, wherein the upward extension strap is vertically adjustable on the boot by means of a portion of the upward extension strap that variably overlaps the top front portion of the boot and is releasably attachable thereto.

5. An orthopedic boot for animals, comprising:

a layer of a first flexible material formed to cover a foot of an animal up to, but not including, a carpal or tarsal joint, a lower portion of the first flexible material forming a toe box;

a slit in the flexible material forming an opening in the flexible material for insertion of the foot into the boot;

a closure mechanism comprising first and second parts on respective opposed surfaces of the flexible slit for closing the opening;

an upper portion of the toe box comprising a section of a second flexible material made of a stretchable fabric with interwoven strands of rubber or other highly elastic fiber, wherein the second flexible material is more elastic than at least the lower portion of the first flexible material;

an upward extension strap extending upward from a top front portion of the boot; and an upper retainer attached to a top end of the extension strap, the retainer comprising a strap that closes into a loop around a respective leg of the animal above the carpal or tarsal joint thereof.

6. An orthopedic boot for animals, comprising:

a layer of a first flexible material formed to cover a foot of an animal up to, but not including, a carpal or tarsal joint, a lower portion of the first flexible material forming a toe box;

a slit in the flexible material forming an opening in the flexible material for insertion of the foot into the boot;

a closure mechanism comprising first and second parts on respective opposed surfaces of the flexible slit for closing the opening;

a second flexible material replacing an area in the first flexible material above the toe box, wherein the second flexible material is more elastic than at least the lower portion of the first flexible material;

an upward extension strap extending upward from a top front portion of the boot; and an upper retainer attached to a top end of the extension strap, the retainer comprising a strap that closes into a loop around the respective leg of the animal above the carpal or tarsal joint thereof;

wherein the second flexible material allows toes of the foot to curl downward at the end of each stride, and provides elastic tension at an angle that returns the toes upward thereafter.

* * * * *